US008218008B2

(12) United States Patent
Wu et al.

(10) Patent No.: US 8,218,008 B2
(45) Date of Patent: Jul. 10, 2012

(54) METHOD OF DISPLAYING SHOT IMAGE ON CAR REVERSE VIDEO SYSTEM

(75) Inventors: Shie-Ching Wu, Sanchong (TW); Kuo-Hung Liao, Sanchong (TW)

(73) Assignee: Altek Corporation, Hsinchu (TW)

( * ) Notice: Subject to any disclaimer, the term of this patent is extended or adjusted under 35 U.S.C. 154(b) by 1199 days.

(21) Appl. No.: 12/010,699

(22) Filed: Jan. 29, 2008

(65) Prior Publication Data

US 2009/0147085 A1 Jun. 11, 2009

(30) Foreign Application Priority Data

Dec. 7, 2007 (TW) ............................... 96146862 A

(51) Int. Cl.

| | |
|---|---|
| ***H04N 7/00*** | (2011.01) |
| ***H04N 7/18*** | (2006.01) |
| ***H04N 13/00*** | (2006.01) |
| ***H04N 13/02*** | (2006.01) |
| ***H04N 3/14*** | (2006.01) |
| ***B60Q 1/00*** | (2006.01) |
| ***G06K 9/00*** | (2006.01) |
| ***G06K 9/36*** | (2006.01) |
| ***G06F 7/00*** | (2006.01) |
| ***G06F 17/00*** | (2006.01) |
| ***G06F 19/00*** | (2011.01) |
| ***G06F 17/10*** | (2006.01) |
| ***G01C 21/00*** | (2006.01) |

(52) U.S. Cl. ............ 348/148; 348/43; 348/47; 348/118; 348/135; 348/136; 348/137; 348/140; 340/435; 382/103; 382/104; 382/154; 382/236; 382/293; 382/298; 701/36; 701/96; 701/117; 701/216; 701/300

(58) Field of Classification Search ........................ None
See application file for complete search history.

(56) References Cited

U.S. PATENT DOCUMENTS

| | | | | |
|---|---|---|---|---|
| 6,088,527 | A * | 7/2000 | Rybczynski | 396/1 |
| 6,215,898 | B1 * | 4/2001 | Woodfill et al. | 382/154 |
| 2002/0167589 | A1 * | 11/2002 | Schofield et al. | 348/148 |
| 2002/0181803 | A1 * | 12/2002 | Kawakami et al. | 382/293 |
| 2003/0122930 | A1 * | 7/2003 | Schofield et al. | 348/148 |
| 2004/0143380 | A1 * | 7/2004 | Stam et al. | 701/36 |
| 2004/0171184 | A1 * | 9/2004 | Maruyama et al. | 438/33 |
| 2004/0212676 | A1 * | 10/2004 | Mathes et al. | 348/148 |
| 2004/0260469 | A1 * | 12/2004 | Mizusawa | 701/300 |
| 2005/0232469 | A1 * | 10/2005 | Schofield et al. | 382/104 |
| 2005/0265592 | A1 * | 12/2005 | Asano et al. | 382/141 |
| 2006/0099067 | A1 * | 5/2006 | Wigerud | 414/809 |
| 2006/0253246 | A1 * | 11/2006 | Cera et al. | 701/117 |

(Continued)

*Primary Examiner* — Moustafa M Meky
*Assistant Examiner* — Ho Shiu
(74) *Attorney, Agent, or Firm* — Rabin & Berdo, P.C.

(57) ABSTRACT

A method of displaying a shot image on a car reverse video system is described, which is applicable for adjusting an image displaying angle of the car reverse video system with a fixed lens according to a distance from an obstacle. Firstly, a scene image behind the car is shot through using the lens. Then, a distance detector is activated to detect a distance from the obstacle behind the car. If the distance from the obstacle is smaller than a preset distance, a scaling ratio is set according to a ratio of the preset distance to the distance from the obstacle. Finally, according to the scaling ratio and a distance between each pixel in the scene image and a reference point, all pixel pitches are adjusted, such that the scene image is deformed, and thus achieving an effect of switching a viewing angle of the scene image.

5 Claims, 6 Drawing Sheets

U.S. PATENT DOCUMENTS

2006/0268360 A1* 11/2006 Jones ..................... 358/448
2006/0274147 A1* 12/2006 Chinomi et al. ............ 348/118
2006/0287800 A1* 12/2006 Watanabe et al. ........... 701/96
2006/0287826 A1* 12/2006 Shimizu et al. ............ 701/216
2007/0088474 A1* 4/2007 Sugiura et al. ............ 701/36
2007/0091638 A1* 4/2007 Ijzerman et al. ........... 362/611
2007/0120656 A1* 5/2007 Nakanishi et al. .......... 340/435
2007/0127087 A1* 6/2007 Nabemoto et al. ........... 358/468
2007/0147708 A1* 6/2007 Lee ....................... 382/298
2007/0216793 A1* 9/2007 Kuwazawa .................. 348/315
2008/0036875 A1* 2/2008 Jones et al. .............. 348/222.1
2008/0100614 A1* 5/2008 Augst ..................... 345/419
2008/0219572 A1* 9/2008 Kim et al. ................ 382/236
2009/0039236 A1* 2/2009 Yang et al. ............... 250/208.1
2009/0079828 A1* 3/2009 Lee et al. ................ 348/148
2009/0167844 A1* 7/2009 Seki et al. ............... 348/47
2010/0007734 A1* 1/2010 Yamazaki et al. ........... 348/148

* cited by examiner

METHOD OF DISPLAYING SHOT IMAGE ON CAR REVERSE VIDEO SYSTEM

CROSS-REFERENCE TO RELATED APPLICATIONS

This non-provisional application claims priority under 35 U.S.C. §119(a) on Patent Application No(s). 096146862 filed in Taiwan, R.O.C. on Dec. 7, 2007, the entire contents of which are hereby incorporated by reference.

BACKGROUND OF THE INVENTION

1. Field of the Invention

The present invention relates to an image processing method. More particularly, the present invention relates to a method of displaying a shot image on a car reverse video system.

2. Related Art

Car has gradually become the major transportation means, and as the rapid progress of the car industry, the mass has increasingly higher requirements on the driving safety and comfortableness. The requirements, especially for the driving safety, for example, safety belt, safety air bag, lane departure warning (LDW) system, reverse radar, and other patents for car have been proposed one after another, so as to ensure the driving safety. Generally, rear view mirrors are disposed on the left and right sides of the car and in front of the driver's seat, and provided for the driver to view the circumstance behind the car, thereby reducing the possibility of being crashed externally. In addition, in some cars, a rear ground mirror is further disposed at the back of the car (for example, above a spoiler), which is provided for the driver to directly view the situation within one meter from the ground at the rear end of the car. However, practically, because of the visual field problem of the reflecting mirrors and the rear view mirrors, the visual field information still includes visual field dead angle/blind spot region. Therefore, the car reverse radar technique has been increasingly developed to solve the problem of the visual field dead angle/blind spot region, in which a reverse radar system sends out a signal, and once the reverse radar system receives a signal reflected back due to encountering an obstacle, a warning sound is generated. However, the position where the reverse radar is mounted and the angle for sending the signal by the reverse radar may also have the dead angle problem. For example, when the position of the obstacle is lower than a preset critical point, the reverse radar system cannot receive a reflected signal, such that it cannot detect the obstacle. In addition, the reverse radar system only informs the driver with warning sound, but cannot show the real situation behind the car in real time.

In recent years, a car reverse video system used for shooting the scene behind the car when the car is reversed has been developed. Through the car reverse video system, the traffic situation behind the car is shown in real time (for example, which kind of obstacle behind the car can be determined), and the driver may reverse the car while directly watching the real images behind the car. In usage, the car reverse video system also has the dead angle problem, since the shooting angle is not wide enough. Currently, one way of solving the dead angle problem when shooting images by the car reverse video system is to use a movable lens to dynamically calibrate the shooting angle. When the obstacle is relatively far away from the back of the car, the shooting viewing angle is relative horizontal. When the obstacle is relatively close to the back of the car, the shooting viewing angle is adjusted downwards, such that the viewing angle is made to be close to the back of the car, and thus, the driver is made to have a distinct sense of distance. However, the movable shooting lens device has a higher cost and a higher damaging probability than that of the fixed lens.

SUMMARY OF THE INVENTION

In view of the above viewing angle problem of the car reverse video system, the present invention is directed to a method of displaying a shot image on a car reverse video system, in which a scene image is deformed by calibrating pixel pitches in the shot scene image, such that the shot scene image generates a visual effect of switching the viewing angle.

In order to achieve the above objective of switching the image viewing angle of the shot image, the present invention includes the following steps. Firstly, a scene image behind a car is shot through a photographic lens. Next, a distance detector is activated to detect a distance from an obstacle behind the car. Then, when the distance from the obstacle is smaller than a preset distance, a scaling ratio is set according to an equation below:

Scaling Ratio=Preset Distance/Distance from Obstacle;

Then, according to the scaling ratio and distances between a reference point and all the pixels in the scene image, the pixel pitches are adjusted, such that the scene image is deformed, so as to achieve an effect of switching the viewing angle.

In the method of displaying the shot image on the car reverse video system according to a preferred embodiment of the present invention, the lens of the car reverse video system may be a common lens, a wide angle lens, or a fisheye lens.

In the method of displaying the shot image on the car reverse video system according to the preferred embodiment of the present invention, the step of calculating the distance from the obstacle includes: activating the distance detector and sending an ultrasonic signal; and receiving the ultrasonic signal; and meanwhile, calculating a distance between the obstacle and the car according to a returning time of the ultrasonic signal.

In the method of displaying the shot image on the car reverse video system according to the preferred embodiment of the present invention, the motion of adjusting the pixel pitches in the scene image includes the following steps. Firstly, a first scaling region is disposed at an upper half position of the scene image, and a second scaling region is disposed at a lower half position of the scene image. Then, according to the above scaling ratio, the pixel pitches in the first scaling region are reduced by equal proportion, and the pixel pitches in the second scaling region are enlarged by equal proportion.

In the method of displaying the shot image on the car reverse video system according to the preferred embodiment of the present invention, the motion of adjusting the pixel pitches of the scene image further includes the following steps. Firstly, a reference line is disposed at the scene image according to the scaling ratio. Next, all those pixels above the reference line in the scene image are filtered out. Then, the remaining pixel pitches are increased in a manner of logarithmic scale according to the distance from the reference line. Then, a calibrated image is generated according to the calibrated pixel pitches, and then the calibrated image is displayed on a screen of the car reverse video system.

In view of the above, in the method of displaying the shot image on the car reverse video system of the present invention, the scaling ratio of the shot scene image is mainly determined by means of detecting the distance between the car and the obstacle, and then the pixel pitches in the scene image are calibrated according to the scaling ratio, thus the pixel pitches of the scene image close to the ground are enlarged, thereby generating a visual effect that "the shooting angle is adjusted downwards", so as to achieve an effect of switching the shooting viewing angle, without adjusting the angle of the shooting lens.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The objectives and features of the present invention will be described below in detail through preferred embodiments. However, the concepts of the present invention can also be used in other scope. The embodiments listed below are merely intended to illustrate the objectives and implementation of the present invention, but not to limit the scope thereof.

Figure 1:
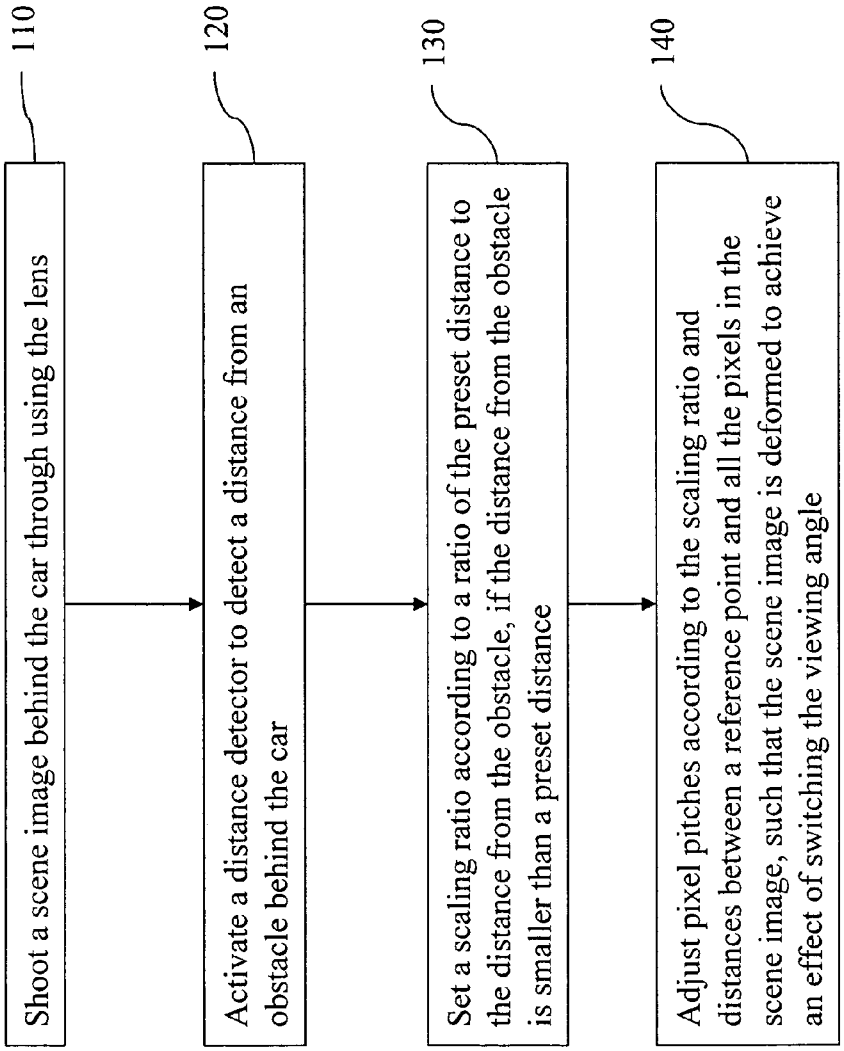
FIG. 1 is a flow chart of a method of displaying a shot image on a car reverse video system.

FIG. 1 is a flow chart of a method of displaying a shot image on a car reverse video system. Referring to FIG. 1, the car reverse video system in this embodiment has, for example, a photographic lens with a fixed shooting angle, which is installed on a rear spoiler or rear bumper, for shooting the scene images behind the car during car reversing. The car reverse video system further has a distance detector, for detecting whether an obstacle exists behind the car or not, and detecting a distance between the car and the obstacle behind the car. Firstly, a scene image behind the car is shot through using the photographic lens (Step S110). Next, the distance detector is activated, to detect a distance from the obstacle behind the car (Step S120). Then, if the distance from the obstacle is smaller than the preset distance, a scaling ratio is set according to an equation below:

Scaling Ratio=Preset Distance/Distance from Obstacle (Step *S*130);

Then, according to the scaling ratio and distances between a reference point and all the pixels in the scene image, the pixel pitches are adjusted, such that the scene image is deformed, so as to achieve an effect of switching the viewing angle (Step S140).

Figure 2:
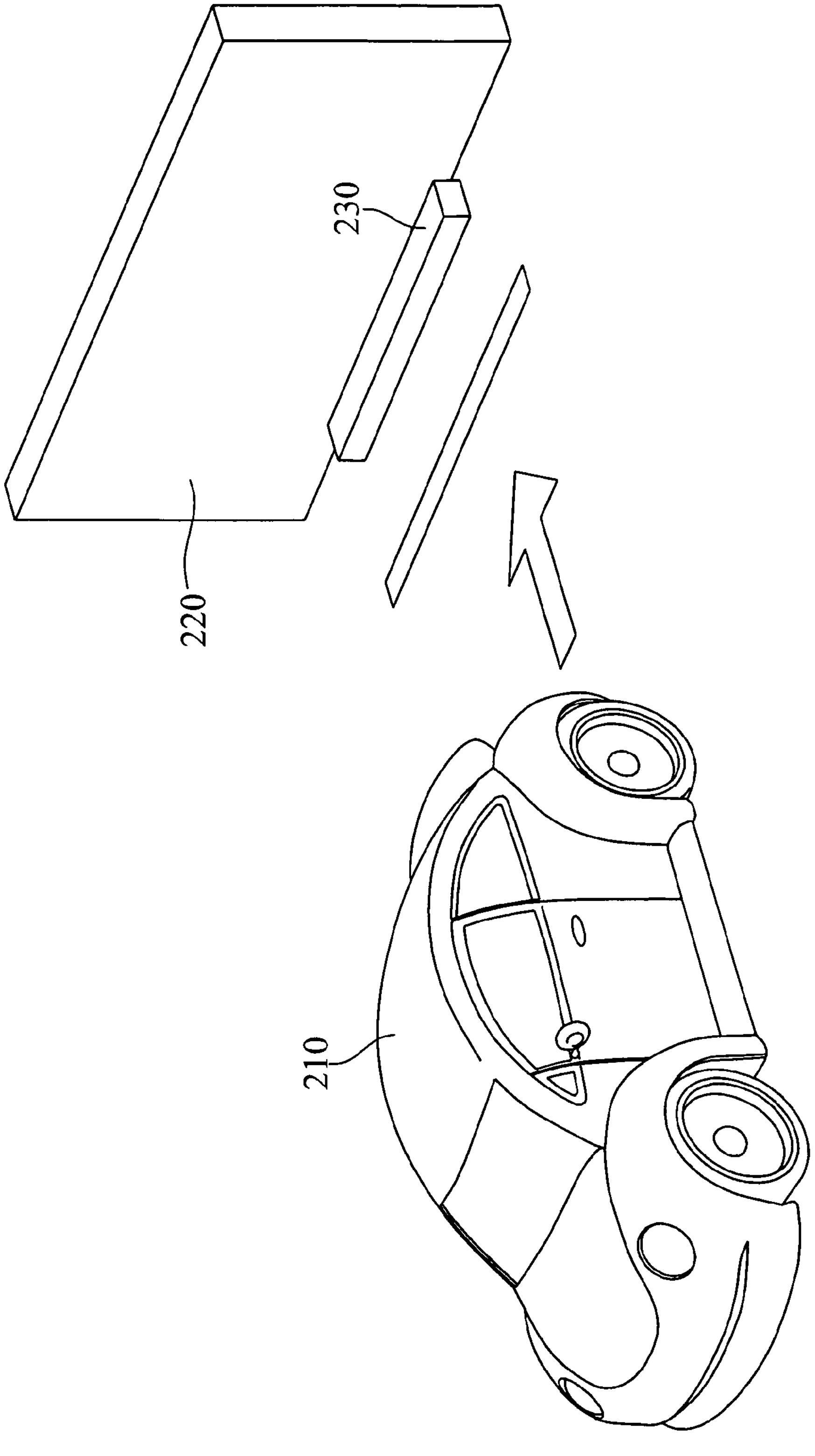
FIG. 2 is a schematic view of a car reverse motion.
Figure 3A:
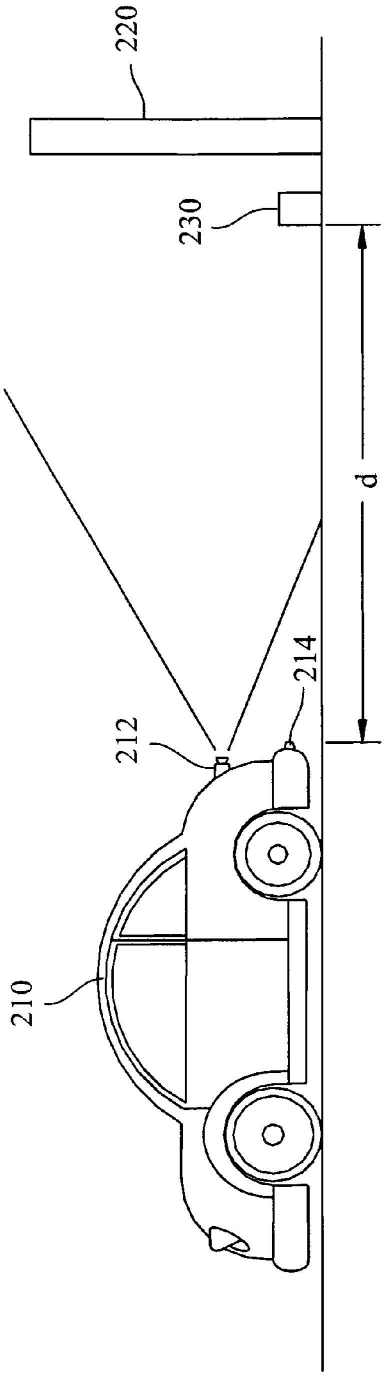
FIG. 3A is a schematic view of the car reverse motion under the assistant of the car reverse video system.

The method of displaying the shot image on the car reverse video system in this embodiment is illustrated below through the following example. FIG. 2 is a schematic view of a car reverse motion. Referring to FIG. 2, an obstacle 230 is placed near a wall 220, and the driver reverses the car for parking the car 210 at a parking space in front of the wall 220. FIG. 3A is a schematic view of the car reverse motion under the assistant of the car reverse video system. Referring to FIG. 3A, a photographic lens 212 is installed on the spoiler (not shown) of the car 210, for shooting the scene images behind the car during car reversing. In addition, a distance detector 214 is also installed on the rear bumper of the car 210, for detecting the distance between the car 210 and the obstacle 230 behind the car. In this embodiment, the photographic lens 212 is, for example, a wide angle lens, which has a wider shooting angle than that of a common lens (in this embodiment, for example, a wide angle lens with a viewing angle of 100-120 degrees is used). The viewing angle of the lens may cover the entire scene behind the car, which does not easily have the visual dead angle problem as compared with the common lens. However, considering the cost, the common lens may also be used to replace the wide angle lens. In some embodiments, a fisheye lens with an even wider viewing angle (the viewing angle of the fisheye lens can reach up to 180 degrees) is used to replace the wide angle lens, so as to provide much wider viewing angle scope.

Figure 3B:
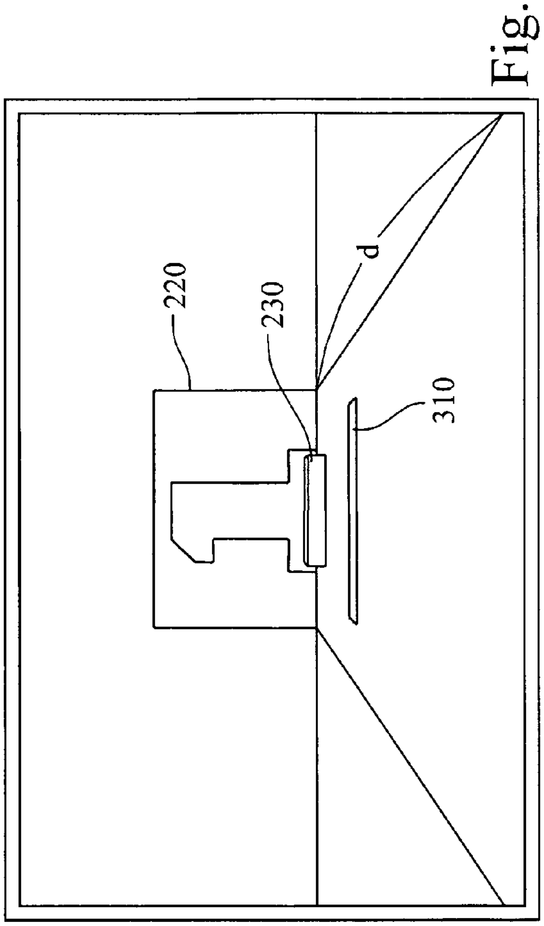
FIG. 3B shows a scene image behind the car obtained when the method of displaying the shot image on the car reverse video system is executed in the car reverse video system in FIG. 3A.

FIG. 3B shows a scene image behind the car obtained when the method of displaying the shot image on the car reverse video system is executed in the car reverse video system in FIG. 3A. Referring to FIGS. 3A and 3B, during the car reversing, the car reverse video system executes the method of displaying the shot image on the car reverse video system of the present invention. The scene image behind the car is shot through using the photographic lens 212, and the distance detector 214 is used to detect whether an obstacle exists behind the car or not and to calculate the distance from the obstacle. In this embodiment, the step of calculating the distance from the obstacle includes: firstly, the distance detector 214 is activated and sends an ultrasonic signal; then, after receiving the reflected ultrasonic signal, the distance detector 214 calculates a distance d between the car 210 and the obstacle 230 according to a returning time of the ultrasonic signal. In this embodiment, the distance detector 214 detects that an elongated obstacle 230 exists at the distance d away from the back of the car 210. At this time, the car reverse video system determines that the distance from the obstacle is not smaller than the preset distance, such that the shot image is not calibrated.

Figure 4A:
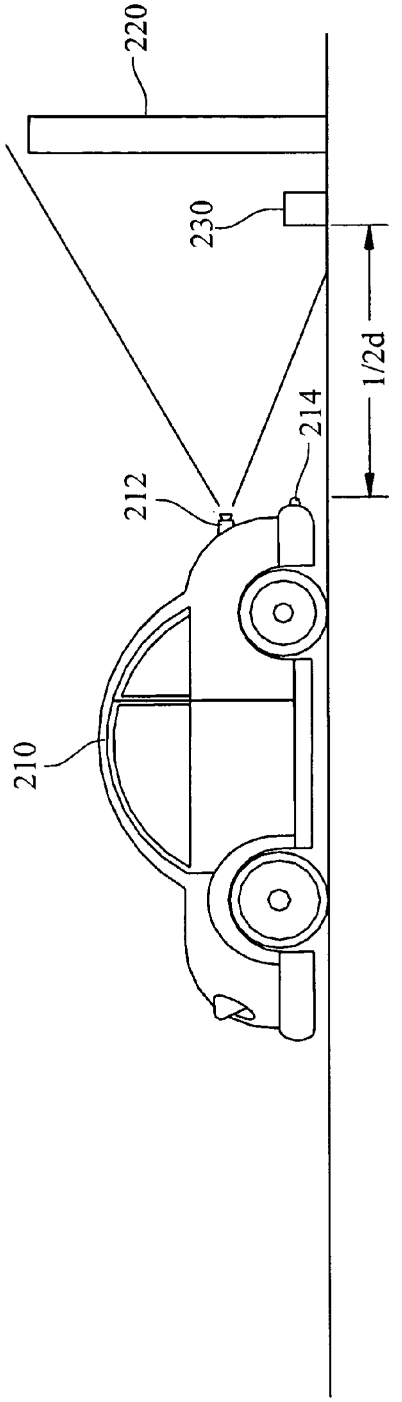
FIG. 4A is a schematic view of the car reverse under the assistant of the car reverse video system.
Figure 4B:
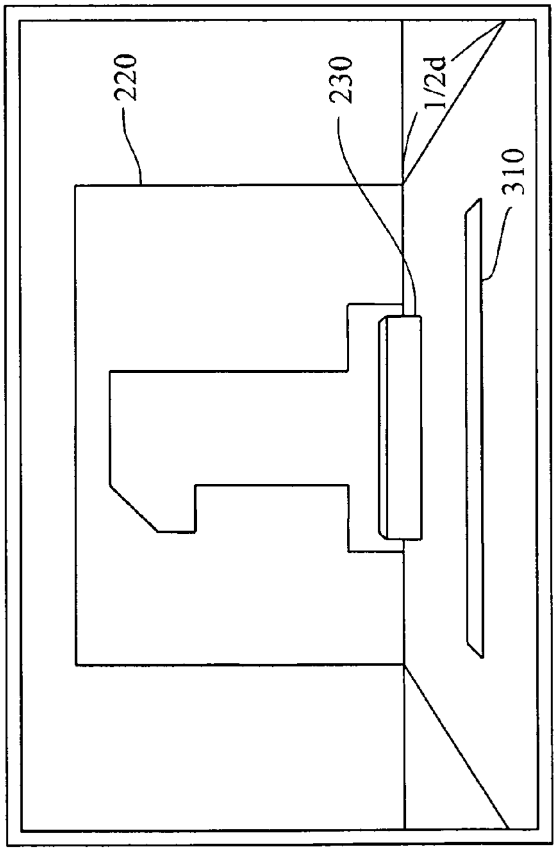
FIG. 4B shows a scene image behind the car shot by the car reverse video system in FIG. 4A.

FIG. 4A is a schematic view of the car reverse under the assistant of the car reverse video system. Referring to FIG. 4, when the car 210 is continuously reversed backwards, the distance detector 214 detects that the distance from the obstacle 230 behind the car is ½d, and it is determined that this distance is smaller than the preset distance. At this time, the photographic lens 212 firstly shoots the scene image behind the car and registers the scene image in the car reverse video system. FIG. 4B shows a scene image behind the car shot by the car reverse video system in FIG. 4A. Referring to FIG. 4B, as seen from the drawing that, a huge Arabic number 1 is shown on the wall 220, an obstacle 230 exists in front of the wall 220, a parking line 310 is drawn in front of the obstacle 230, and two words "Parking Line" is painted on the ground between the parking line 310 and the obstacle 230.

Once the car reverse video system determines that the distance from the obstacle 230 behind the car is smaller than the preset distance, it begins to process the scene image. In this embodiment, the preset distance is, for example, the distance d. According to a ratio of the preset distance to the distance from the obstacle (the ratio is 2 in this embodiment), a scaling ratio is calculated, and the pixel pitches in the shot scene image are adjusted according to the scaling ratio, so as to generate the deformed scene image.

Figure 4C:
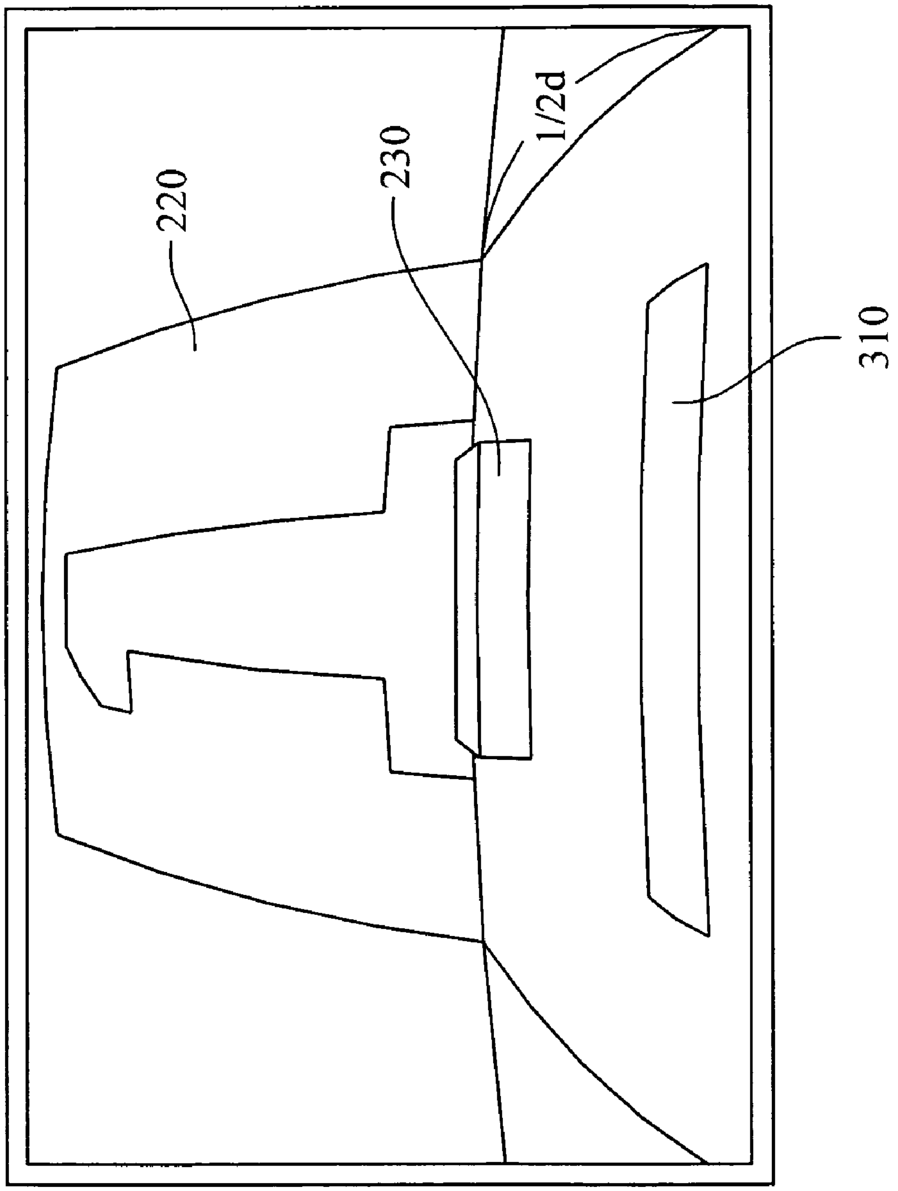
FIG. 4C shows a scene image behind the car obtained through the method of displaying the shot image on the car reverse video system executed in the car reverse video system in FIG. 4A.

FIG. 4C shows a scene image behind the car obtained through the method of displaying the shot image on the car reverse video system executed in the car reverse video system in FIG. 4A. Referring to FIGS. 4B and 4C, firstly, a reference point is disposed in the shot scene image (as shown in FIG. 4B), which is, for example, a specific point (not shown) on the wall 220 in this embodiment. Then, according to the distance between all the pixels in the scene image and the reference point, as well as the scaling ratio (that is, the ratio of the preset distance to the distance from the obstacle), the pixel pitches are calibrated in a radial manner from the reference point. After the image has been calibrated in the radial manner, the scene image as shown in FIG. 4C may be output. In FIG. 4C, each pixel at the upper part of the scene image is compressed, and each pixel at the lower part of the scene image is enlarged, and thus, the generated deformed scene image can achieve a visual effect just like overlooking the ground. In this manner, through such image processing, the effect of switching the viewing angle can be achieved.

Figure 4D:
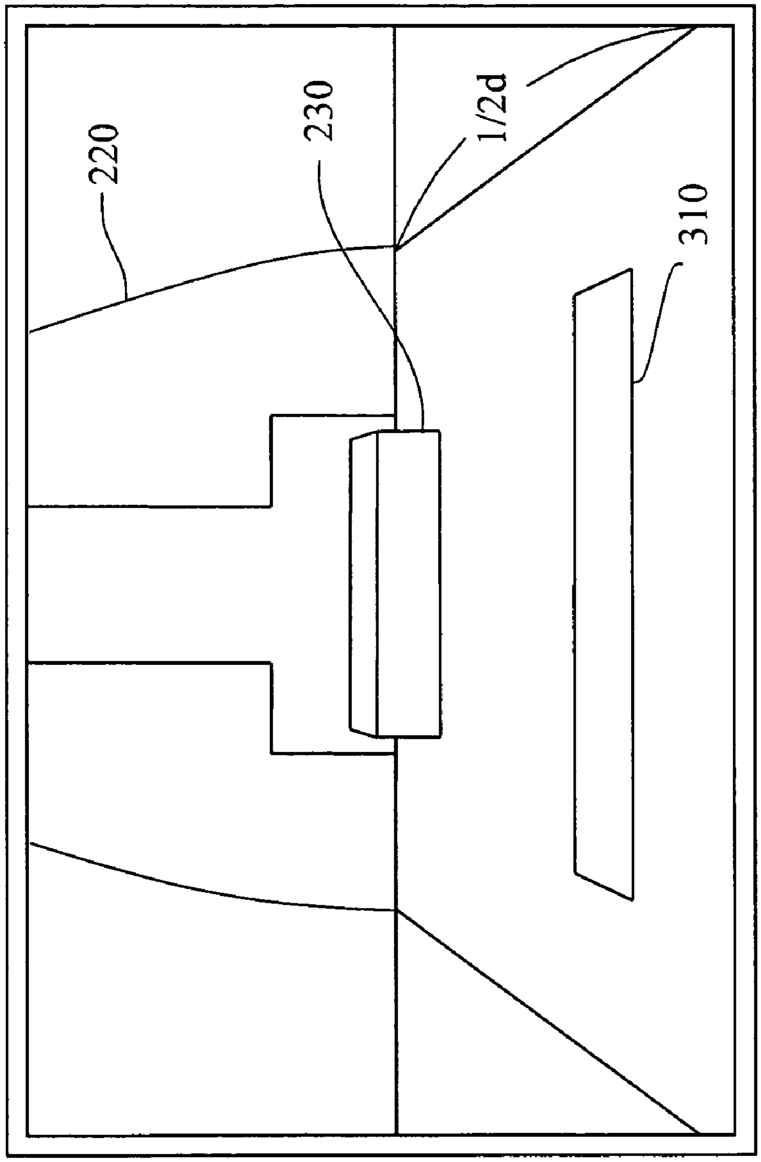
FIG. 4D shows another scene image behind the car obtained through the method of displaying the shot image on the car reverse video system executed in the car reverse video system in FIG. 4A.

In addition, in some embodiments, the effect of overlooking the ground is achieved by cutting off the upper part of the shot scene image and enlarging the lower part of the image. FIG. 4D shows another scene image behind the car obtained through the method of displaying the shot image on the car reverse video system executed in the car reverse video system in FIG. 4A. Referring to FIGS. 4B and 4D, firstly, according to the scaling ratio, the car reverse video system disposes a reference line in the shot scene image. Next, those pixels above the reference line in the scene image are filtered out, and the remaining pixel pitches are adjusted. In this embodiment, for example, taking a center point of the reference line as a reference, each pixel pitch is enlarged in a radial manner. Each remaining pixel pitch is increased (the pixel pitches are enlarged) in a manner of logarithmic scale according to the distance from the center of the reference line. Then, according to the calibrated pixel pitches, a calibrated image is generated, such that the calibrated image is displayed on a screen of the car reverse video system (as shown in FIG. 4D).

To sum up, the car reverse video system does not use a photographic lens with variable shooting angle, but merely executes the "method of displaying a shot image on a car reverse video system" of the present invention to process the image shot by the photographic lens with fixed shooting angle, and thus visually changing the viewing angle of the shot scene image. The method of displaying the shot image of the present invention at least has the following advantages.

1. As for the shooting and imaging of the car reverse video system, the viewing angle of the shot image is changed according to the distance from the obstacle, such that the driver has a distinct sense of distance, which is helpful for the driver to grasp the road situation behind the car.

2. The photographic lens can change the shot viewing angle, without being turned frequently, which effectively avoids the probability of damaging the photographic lens, and thereby saving the maintenance cost of the car reverse video system.

What is claimed is:

1. A method of displaying a shot image on a car reverse video system, executed in a car reverse video system, for automatically calibrating a displaying angle of an image shot by a photographic lens with a fixed shooting angle, comprising:

shooting a scene image behind the car through using the lens;

activating a distance detector to detect a distance from an obstacle behind the car;

determining if the distance from the obstacle is smaller than a preset distance;

if yes, setting a scaling ratio according to an equation below:

Scaling Ratio=preset distance/distance between the car and the obstacle;

adjusting pixel pitches of the scene image according to the scaling ratio and distances between a reference point and all pixels in the scene image to produce an adjusted scene image; and displaying the adjusted scene image on the car reverse video system.

2. The method of displaying a shot image on a car reverse video system as claimed in claim 1, wherein the lens is one selected from a group consisting of a common lens, a wide angle lens, and a fisheye lens.

3. The method of displaying a shot image on a car reverse video system as claimed in claim 1, wherein the step of activating a distance detector to detect the distance from the obstacle comprises:

sending an ultrasonic signal from the distance detector; and receiving the ultrasonic signal, and calculating a distance between the obstacle and the car according to a returning time of the ultrasonic signal.

4. The method of displaying a shot image on a car reverse video system as claimed in claim 1, wherein the step of adjusting pixel pitches comprises adjusting the pixel pitches from the reference point in a radial manner.

5. The method of displaying a shot image on a car reverse video system as claimed in claim 1, wherein the step of adjusting pixel pitches further comprises:

disposing a reference line at the scene image according to the scaling ratio;

filtering out pixels above the reference line in the scene image;

increasing the remaining pixel pitches in a manner of a logarithmic scale according to a distance from the reference line;

generating a calibrated image according to the calibrated pixel, the calibrated image being the adjusted scene image that is displayed on the car reverse video system.

* * * * *